Patented Nov. 24, 1936

2,061,732

UNITED STATES PATENT OFFICE 2,061,732

CELLULOSE DERIVATIVE COMPOSITIONS

Emmette F. Izard, Elsmere, Del., assignor, by mesne assignments, to E. I. du Pont de Nemours & Company, Wilmington, Del., a corporation of Delaware No Drawing. Application November 10, 1933, Serial No. 697,473

7 Claims. (Cl. 106—40)

This invention relates to cellulose derivative compositions, and more particularly, to cellulose derivative compositions comprising a solvent consisting of a binary mixture containing water.

Heretofore it has been known that dimethyl ether of ethylene glycol is a solvent for cellulose derivatives and is quite advantageous as a solvent for cellulose acetate. However, this compound, as far as can be discovered, has always been used in anhydrous condition. It has a boiling point of 83° C. and can be used to give a clear solution with cellulose acetate containing by weight 54.5–56% acetyl, but will not give a clear solution with a cellulose acetate having by weight a 51% acetyl content. Likewise, it has been known that anhydrous dimethyl ether of propylene glycol, boiling at 92–93° C. is a solvent for cellulose nitrate and the cellulose ethers. Prior to the present invention it was considered essential to employ these solvents in anhydrous mixtures, an obvious drawback common to many cellulose derivative solvents, inasmuch as it requires the use of thoroughly dried cellulose acetate and other components.

An object of the present invention is to provide cellulose derivatives in which the components do not have to be dried. A further object is to provide cellulose acetate compositions which will give clear solutions, even though a cellulose acetate having an acetyl content as low as 51% by weight is employed. Further objects of the present invention will be apparent from the description given hereinafter.

The above objects are accomplished according to the present invention by dissolving a cellulose derivative in a binary mixture of water and dimethyl ether of ethylene glycol, the proportion of water being not in excess of that which will give an azeotropic mixture with the dimethyl ether of ethylene glycol, or by dissolving a cellulose derivative from the group consisting of cellulose nitrate and cellulose ethers in a binary mixture of water and a compound selected from the group consisting of dimethyl ether of ethylene glycol and dimethyl ether of propylene glycol, the proportion of water being not in excess of that which will give an azeotropic mixture with the compound selected.

It has been discovered that dimethyl ether of ethylene glycol, boiling at 83° C., when mixed with water will give an azeotropic mixture boiling at 76° C. It has been determined that this mixture comprises approximately 10.5–11% water by weight. It has further been discovered that this binary of water and dimethyl ether of ethylene glycol is not only a solvent for cellulose derivatives and, since the compositions do not have to be substantially anhydrous, an obviously improved solvent over anhydrous dimethyl ether of ethylene glycol, but also that the binary mixture is, particularly for cellulose acetate, a much better solvent than anhydrous dimethyl ether of ethylene glycol, aside from the above considerations. Whereas anhydrous dimethyl ether of ethylene glycol will only give a clear solution of cellulose acetate where the acetyl content is 54.5–56% by weight, the binary mixture will give a clear solution of cellulose acetate of much wider range acetyl content. For example, the binary mixture will give a clear solution of cellulose acetate having an acetyl content of 51% by weight, or even lower, whereas the anhydrous dimethyl ether of ethylene glycol will not do this.

Likewise, a similar discovery has been made with respect to dimethyl ether of propylene glycol. It has been found that a mixture of dimethyl ether of propylene glycol and water forms an azeotropic mixture boiling at 80° C., as compared to the boiling point of 92–93° C. for the anhydrous ether. This azeotropic mixture has been found to be an excellent solvent for cellulose nitrate and the cellulose ethers.

It is to be understood that these new solvent mixtures are by no means limited to the azeotropic mixture of the respective ether with water, but comprise a binary mixture of the respective ethers with any amount of water not in excess of that which will give an azeotropic mixture. It is apparent that if a proportion of water in excess of that which will give an azeotropic mixture is employed, the excess water will be left in the composition after the ether has evaporated. If this excess is substantial, it naturally follows that a satisfactory film or plastic will not be produced. On the other hand, as will be understood by those skilled in the art, a slight excess is permissible to the same extent that water is permissible in the compositions heretofore known, which had to be kept substantially anhydrous. The present invention is applicable to both cellulose derivative coating compositions and plastic compositions and the following examples, in which parts are given by weight, illustrate specific embodiments of the present invention:

Example 1

| | Parts |
|---|---|
| Cellulose acetate | 12 |
| Methoxyethyl phthalate | 6 |
| Dimethyl ether of ethylene glycol-water binary | 182 |

Example 2

| | Parts |
|---|---|
| Ethyl cellulose | 4 |
| Dibutyl phthalate | 1 |
| Dimethyl ether of propylene glycol-water binary | 24 |

Example 3

| | Parts |
|---|---|
| Cellulose nitrate | 12 |
| Resin | 3 |
| Oil | 2.5 |
| Plasticizer | 4 |
| Dimethyl ether of ethylene glycol-water binary | 166 |

The above examples illustrate typical coating compositions which dry in a few minutes to give hard, transparent films. The components of the binaries in these examples are in substantially the proportions to give azeotropic mixtures.

Example 4

| | Parts |
|---|---|
| Cellulose nitrate | 100 |
| Camphor | 35 |
| Dimethyl ether of ethylene glycol-water binary | 50 |

Example 5

| | Parts |
|---|---|
| Cellulose acetate | 100 |
| Dimethyl phthalate | 40 |
| Dimethyl ether of ethylene glycol | 47 |
| Water | 3 |

Example 6

| | Parts |
|---|---|
| Ethyl cellulose | 100 |
| Dibutyl phthalate | 20 |
| Dimethyl ether of propylene glycol | 45 |
| Water | 5 |

The above examples are typical plastic compositions according to the present invention. The binary in Example 4 is in substantially the proportion to give an azeotropic mixture. It will be understood that in the above examples the solvents are used in the preparation of plastics but that the finished plastic sheet, or the like, is freed of the solvent by a suitable drying operation, as is well known in the art.

It is to be understood that in the above examples other cellulose derivatives could be employed, such as benzyl cellulose and similar ethers, and cellulose propionate and similar esters. The addition of pigments, fillers, other plasticizers, resins, and various modifiers, of course, is permissible, as is well understood by those skilled in the art. Likewise, the binaries in the above formulas may be replaced in part by other solvents such as the anhydrous ethers, esters, alcohols, ketones and hydrocarbons which are generally used in the formulation of cellulose derivative lacquers.

Both dimethyl ether of ethylene glycol and dimethyl ether of propylene glycol are miscible in all proportions with water, and to form azeotropic mixtures it is merely necessary to distill over the wet ethers. An unusual property of these compositions is that they deposit films without blushing when dried in the open air at room temperature. It is generally known that when a film is cast from a water miscible solvent boiling below 100° C., that the film usually dries with a cloudy appearance, called blushing, due to the absorption of moisture from the air during the drying. However, since the present binaries actually boil at a lower temperature than the pure ether, water tends to be absorbed in the binary and vaporize with the ether, thereby eliminating any cloudiness in the film.

The compositions of the present invention may be used in the preparation of all types of cellulose derivative compositions, such as lacquers for coating metal and wood, dopes for coating fabrics, and plastic compositions for use in the manufacture of toilet articles, novelties, sheeting, rods, tubes, and the like.

Many advantages of the present invention will be apparent from the description herein given, but it is desired to particularly point out the advantage derived from the fact that the present compositions do not require water-free ingredients. A further particular and important advantage is the fact that cellulose acetate films can be deposited from solutions of cellulose acetate in the binary of water and dimethyl ether of ethylene glycol which are perfectly clear and free of blushing. Cellulose acetate having a low acetyl content, when dissolved in anhydrous dimethyl ether of ethylene glycol, will not give a clear solution. The azeotropic mixture of water and dimethyl ether of ethylene glycol has a convenient boiling point of 76° C. which is considerably higher than the boiling point of acetone, yet appreciably lower than the methyl ether of ethylene glycol or dioxan, all of which are commonly used in the preparation of these plastics. Having available a new solvent with a different boiling point is, in itself, a material contribution to this art, since compositions designed for various purposes and uses under different conditions, frequently require the use of solvents having a boiling point within a narrow range which may not cover the boiling point of the commonly available cellulose acetate solvents.

As many apparently widely different embodiments of this invention may be made without departing from the spirit and scope thereof, it is to be understood that the invention is not limited to the specific embodiments thereof except as defined in the appended claims.

I claim:
1. A composition comprising a cellulose derivative and, as a solvent therefor, a binary mixture of water and dimethyl ether of ethylene glycol, the proportion of water being not in excess of that which will give an azeotropic mixture with the dimethyl ether of ethylene glycol and the binary mixture being capable of giving a clear solution of cellulose acetate having an acetyl content of 51%.

2. A composition comprising a cellulose derivative and, as a solvent therefor, an azeotropic mixture of water and dimethyl ether of ethylene glycol.

3. A composition comprising cellulose acetate and, as a solvent therefor, a binary mixture of water and dimethyl ether of ethylene glycol, the proportion of water being not in excess of that which will give an azeotropic mixture with the dimethyl ether of ethylene glycol and the binary mixture being capable of giving a clear solution of cellulose acetate having an acetyl content of 51%.

4. A composition comprising cellulose acetate and, as a solvent therefor, an azeotropic mixture of water and dimethyl ether of ethylene glycol.

5. A composition comprising a cellulose derivative selected from the group consisting of cellulose nitrate and cellulose ethers and, as a solvent therefor, an azeotropic mixture of water with a compound from the group consisting of dimethyl ether of ethylene glycol and dimethyl ether of propylene glycol.

6. A composition comprising a cellulose derivative selected from the group consisting of cellulose nitrate and cellulose ethers and, as a solvent therefor, an azeotropic mixture of water and dimethyl ether of ethylene glycol.

7. A composition comprising cellulose acetate and, as a solvent therefor, a binary mixture of water and the dimethyl ether of ethylene glycol, the proportion of water being at least 3 parts by weight to 47 parts of the glycol ether but not in excess of that proportion which will give an azeotropic mixture with the dimethyl ether of ethylene glycol.

EMMETTE F. IZARD.